United States Patent
Frenzel et al.

(10) Patent No.: US 6,448,734 B1
(45) Date of Patent: Sep. 10, 2002

(54) METHOD FOR CURRENT REGULATION OF PERMANENTLY EXCITED SYNCHRONOUS MOTORS FOR GUIDED MISSILES HAVING AN ELECTROMECHANICAL ACTUATING DRIVE FOR THE RUDDER

(75) Inventors: Bernhard Frenzel; Fridbert Kilger, both of Munich (DE)

(73) Assignee: LFK Lenkflugkoerpersysteme GmbH, Munich (DE)

( * ) Notice: Subject to any disclaimer, the term of this patent is extended or adjusted under 35 U.S.C. 154(b) by 0 days.

(21) Appl. No.: 09/785,661

(22) Filed: Feb. 20, 2001

(30) Foreign Application Priority Data

Feb. 17, 2000 (DE) .......................................... 100 07 120

(51) Int. Cl.$^7$ ................................................. H02P 5/28
(52) U.S. Cl. ........................ 318/700; 318/430; 318/433; 318/582; 318/584; 318/585; 318/586
(58) Field of Search ................................. 318/700, 430, 318/433, 582, 584, 585, 586

(56) References Cited

U.S. PATENT DOCUMENTS

| | | | | |
|---|---|---|---|---|
| 3,642,233 A | * | 2/1972 | Bezerie | 102/213 |
| 3,946,691 A | * | 3/1976 | Freeman | 114/144 E |
| 3,972,224 A | * | 8/1976 | Ingram | 701/123 |
| 4,612,488 A | * | 9/1986 | Uhlemann et al. | 244/3.18 |
| 4,683,407 A | * | 7/1987 | Barba et al. | 244/76 A |
| 4,991,429 A | * | 2/1991 | Stacey et al. | 318/490 |
| 5,649,422 A | * | 7/1997 | Baginski et al. | 60/431 |
| 5,670,856 A | * | 9/1997 | Le et al. | 244/194 |
| 6,075,332 A | * | 6/2000 | McCann | 318/430 |
| 6,362,590 B2 | * | 3/2002 | Nozari | 318/609 |

FOREIGN PATENT DOCUMENTS

DE 196 35 847 C2 9/1996

* cited by examiner

Primary Examiner—Marlon T. Fletcher
Assistant Examiner—Rita Leykin
(74) Attorney, Agent, or Firm—Crowell & Moring LLP

(57) ABSTRACT

In a method for current regulation of permanently excited synchronous motors for guided missiles with an electromechanical actuating drive for the rudder, the commanded current is always guided orthogonally to the magnet-wheel flow. Further:

a) from measured current of two voltage phases, a measured magnitude of a current-space pointer is determined and an error value for the current is added to a desired value of the amount via a correction regulator; and b) from measured current of two voltage phases as well as from the angle command of the current-space pointer, a measurement for the angle error is determined and added to the desired angle value via a correction regulator.

The method according to the invention can be implemented with little hardware expenditure and in a compact design size, even for high rotational speeds of >10,000 min$^{-1}$. Current-regulating methods used heretofore, which involve frequency response compensation in polar coordinates, cannot be used with synchronous motors, i.e. explicit determination of the angle of the space-current pointer fails in cases where the measured current disappears.

2 Claims, 3 Drawing Sheets

METHOD FOR CURRENT REGULATION OF PERMANENTLY EXCITED SYNCHRONOUS MOTORS FOR GUIDED MISSILES HAVING AN ELECTROMECHANICAL ACTUATING DRIVE FOR THE RUDDER

BACKGROUND AND SUMMARY OF THE INVENTION

This application claims the priority of German patent document 100 07 120.1, filed Feb. 17, 2000, the disclosure of which is expressly incorporated by reference herein.

The invention relates to a method for regulating the current flow in a permanently excited synchronous motor for a guided missile having an electromechanical actuating drive for the rudder.

As a result of ever more stringent requirements in respect of dynamics, weight and volume, the use of electromechanical rudder actuating systems in modern guided missiles is increasing. For this purpose, permanently excited synchronous machines with high energy magnets are used as servomotors, due to their low axial mass moment of inertia, their excellent wear resistance and their substantial energy density. For space reasons and because of the low axial mass moment of inertia of the arrangement, force is transmitted to the rudder via a roller spindle driven arrangement, in which the spindle itself is directly linked in a rigid connection to the rotor of the machine. Such a device is described in detail in German patent document DE 196 35 847 C2.

Due to the transmission ratio between the machine and the rudder, the high-frequency spindle drive must be of compact design.

One object of the invention, therefore, is to provide a method of current regulation which results in maximum utilization of the machine at high revolutions.

Another object of the invention is to provide a miniaturized drive that achieves excellent circular acceleration.

To this end, for a given amount of the commanded armature current, the phase position of the impressed machine current must be corrected such that the machine develops maximum torque. In spite of extraneous interference effects, the method must carry out a robust compensation of the phase-frequency characteristic at high rotational speeds. In the case of implementation on a microprocessor, computing time requirements of the method and the requirements concerning scanning time of the control algorithm, are to be kept as low as possible.

These and other advantages are achieved by the method according to the invention, in which the command current is always guided orthogonally to the magnet-wheel flow. Further:

a) from measured current of two voltage phases, a measured magnitude of a current-space pointer is determined and an error value for the current is added to a desired value of the amount via a correction regulator; and b) from the measured current of two voltage phases as well as from the angle command of the current-space pointer, a measurement for the angle error is determined and added to the desired angle value via a correction regulator.

Other objects, advantages and novel features of the present invention will become apparent from the following detailed description of the invention when considered in conjunction with the accompanying drawings.

DETAILED DESCRIPTION OF THE DRAWINGS

The current-regulating method according to the invention causes the commanded current $I_R$ to be guided orthogonally to the magnet-wheel flow for maximum torque development. Calculations are performed in a polar coordinate system with reference to the rotor (field-oriented control).

Figure 1:
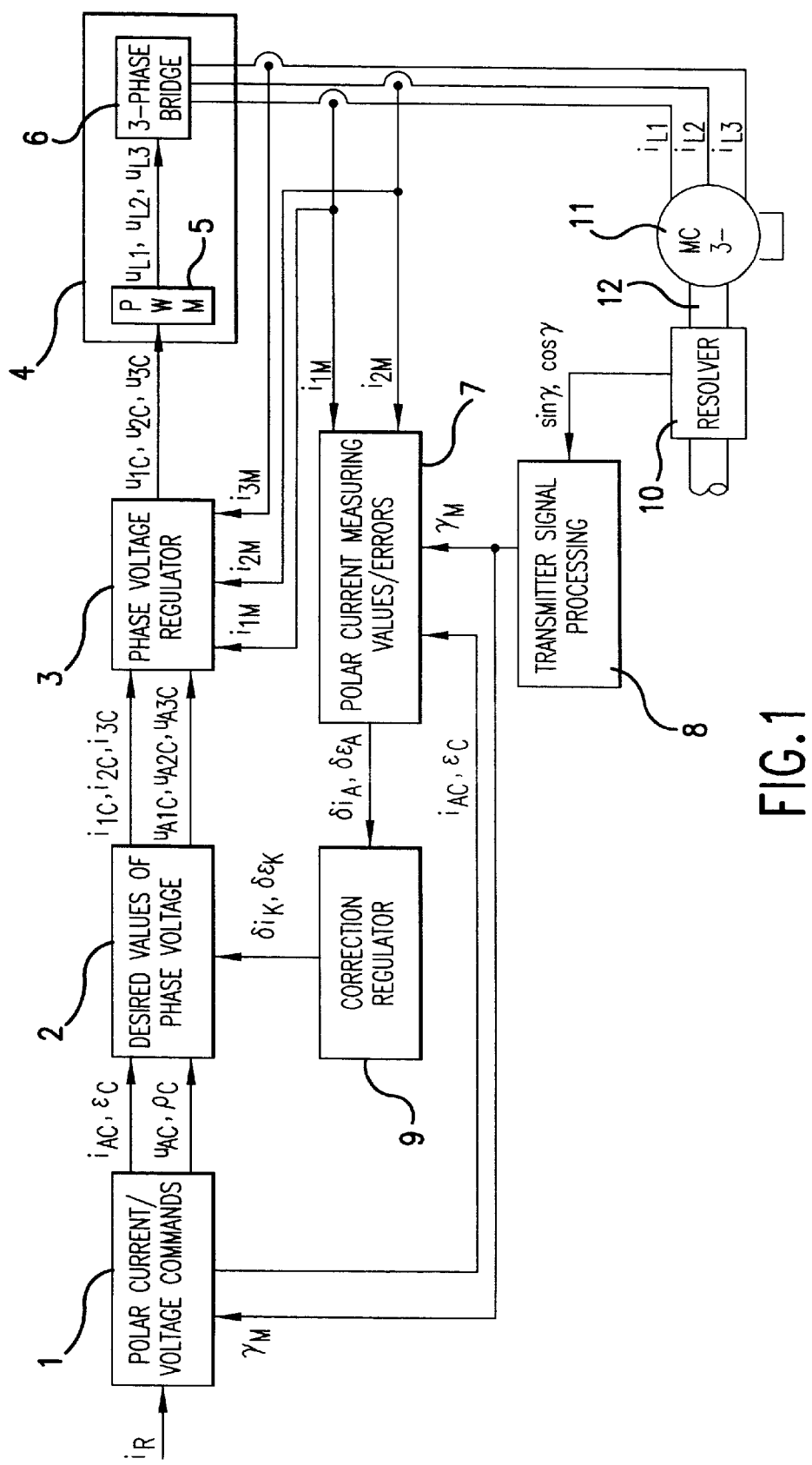
FIG. 1 is a block diagram of the control circuit for carrying out the method according to the invention.

FIG. 1 shows a block diagram of the control circuit with a circuit arrangement for implementing the method.

In this embodiment, the permanently excited synchronous motor 11 is connected on the input side to a final control element 4. The final control element itself comprises a d.c. voltage intermediate circuit converter 6 which is driven by a pulse-width modulator 5. For measuring the position of the magnet wheel, a resolver 10 is rigidly coupled to the shaft 12 of the synchronous machine 11. In transmitter signal processing 8, the magnet wheel position angle $\gamma_M$ is calculated as follows:

$$\gamma_M = a\tan 2\left(\frac{\sin\gamma}{\cos\gamma}\right) \quad (1)$$

Figure 2:
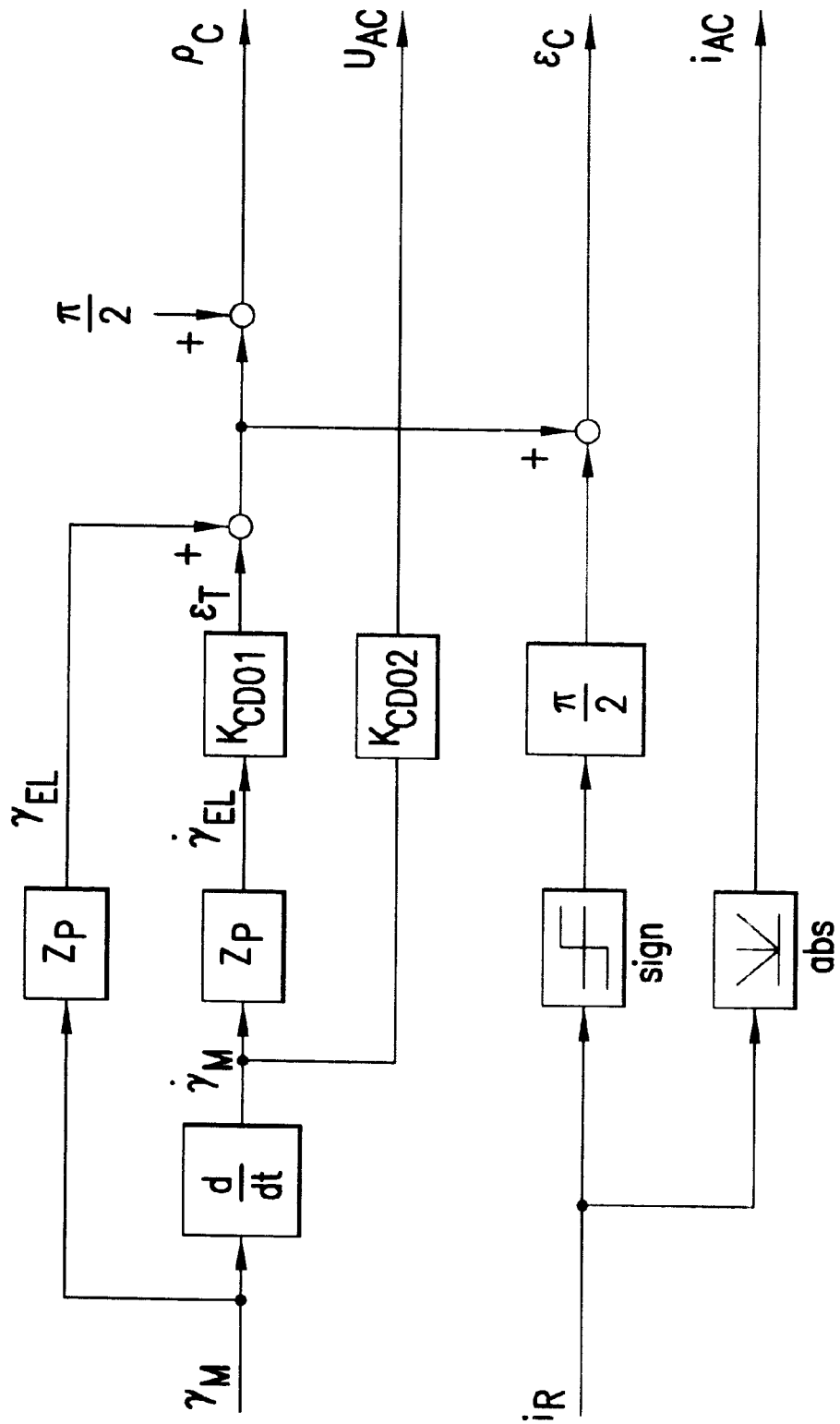
FIG. 2 is a detailed representation of the block "polar current/voltage commands" of FIG. 1.

Conversion of the current command and the electromotive force compensation takes place in block 1 "polar current/voltage commands", as illustrated in FIG. 2. The magnitude $i_{AC}$ and phase angle $\epsilon_C$ of the commanded current $i_R$ is calculated from:

$$i_{AC}=|i_R| \quad (2)$$

$$\varepsilon_C = sign(i_R)\cdot\frac{\pi}{2}+\gamma_{EL}+\varepsilon_T \quad (3)$$

In this, $\epsilon_T$ is the angle for dead-time correction in the digital implementation of the method, Zp is the pole-pair number of the synchronous motor and $\gamma_{EL}$ is the electrical magnet wheel angle:

$$\varepsilon_T = K_{CDO\,1}\cdot Z_P\cdot\frac{d}{dt}\gamma_M \quad (4)$$

$$\gamma_{EL}=Z_P\cdot\gamma_M \quad (5)$$

The voltage $\mu_{AC}$ and the angle $\rho_C$ together form the calculated counter electromotive force of the synchronous motor:

$$u_{AC} = K_{CDO\,2}\cdot\frac{d}{dt}\gamma_M \quad (6)$$

$$\rho_C = \frac{\pi}{2}+\gamma_{EL}+\varepsilon_T \quad (7)$$

The desired values of phase voltages of the three-phase system are calculated after correction of the amount and the phase in block 2/FIG. 1 "desired values of phase voltage":

$$i_{1C}=i_{AK}\cdot\cos(\epsilon_K) \quad (8)$$

$$i_{2C} = i_{AK}\cdot\cos\left(\varepsilon_K+\frac{2\pi}{3}\right) \quad (9)$$

$$i_{3C} = i_{AK}\cdot\cos\left(\varepsilon_K-\frac{2\pi}{3}\right) \quad (10)$$

The amount $i_{AK}$ and the angle $\epsilon_K$ result from adding the commanded values with the output values of correction regulator 9/ according to FIG. 1:

$$i_{AK}=i_{AC}+\delta i_K \tag{11}$$

$$\epsilon_K=\epsilon_C+\delta\epsilon_K \tag{12}$$

Representation of the counter electromotive force in the three-phase system is as follows:

$$u_{A1C}=u_{AC}\cdot\cos(\rho_c) \tag{13}$$

$$u_{A2C}=u_{AC}\cdot\cos\left(\rho_C+\frac{2\pi}{3}\right) \tag{14}$$

$$u_{A3C}=u_{AC}\cdot\cos\left(\rho_C-\frac{2\pi}{3}\right) \tag{15}$$

Figure 3:
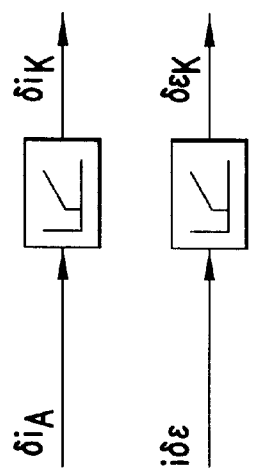
FIG. 3 is a functional block diagram of the correction regulator of FIG. 1.

In the correction regulator 9/FIG. 1, the current amount correction value $\delta i_K$ and the correction value of the current angle $\delta\epsilon_K$ are the output values of two PI regulators; FIG. 3 shows a function diagram.

Values for the current error $\delta i_A$ and the angle error $i\delta\epsilon$ in FIG. 3 are determined in block 7/FIG. 1 "Polar current measuring values/errors". For this purpose, the magnitude of the measured space-current pointer $i_{AM}$ is formed from the measured values $i_{1M}$ and $i_{2M}$ of the phase voltage:

$$i_{XS}=i_{1M} \tag{16}$$

$$i_{YS}=-\frac{2}{\sqrt{3}}\left(i_{2M}+\frac{1}{2}i_{1M}\right) \tag{17}$$

$$i_{AM}=\sqrt{i_{XS}^2+i_{YS}^2} \tag{18}$$

The error amount of the current then results for:

$$\delta i_A=i_{AC}-i_{AM} \tag{19}$$

The fraction $i_D$ of the measured current $i_{AM}$ in longitudinal direction relative to the axis of the magnet wheel is used as the measure for the angle error. It must be pointed out that as a rule, direct calculation of the angle $\epsilon_M$ of the measured current by calculation from the atan2 function is too intensive in computing time. Furthermore, in the case of $i_{AM}=0$ the calculation fails because in this case the angle $\epsilon_M$ is indeterminate. Thus we arrive at the following:

$$i\delta\epsilon=i_{XS}\cdot\sin(\epsilon_C)-i_{YS}\cdot\cos(\epsilon_C) \tag{20}$$

In addition, the value calculated in equation (20) corresponds to:

$$i\delta\epsilon=i_D\cdot\text{sign}(i_R)=i_{AM}\cdot\sin(\epsilon_C-\epsilon_M)$$

Figure 4:
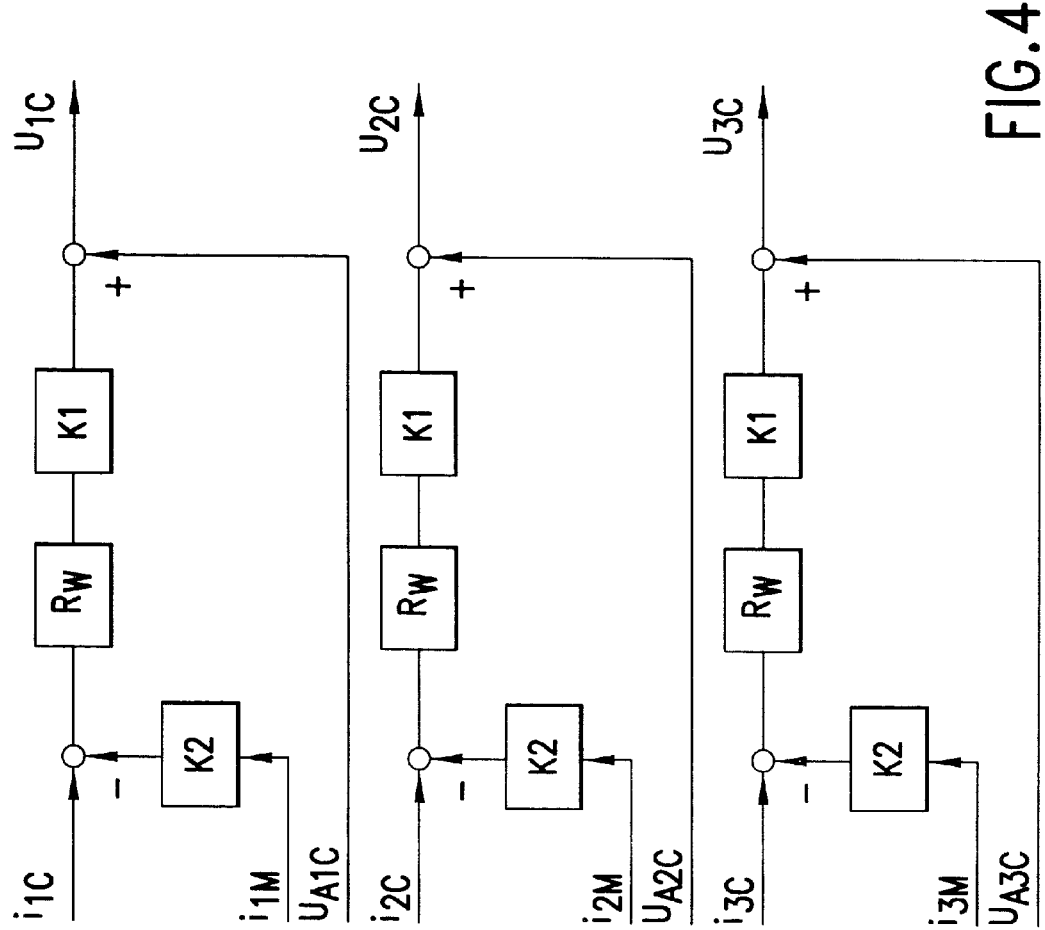
FIG. 4 is a functional block diagram of the phase voltage regulator of FIG. 1.

FIG. 4 is a function diagram that shows the phase voltage regulator 3/FIG. 1. The amplifications K1 and K2 in FIG. 4 are to be set such that in the case of a fixed-voltage rotor of the synchronous motor 11/FIG. 1, the measured current $i_{AM}$ asymptotically follows the commanded current $i_R$ in the case of $i_R$ being stepped. From this, amplification K2 is determined as follows:

$$K2=1-\frac{1}{K1} \tag{21}$$

In FIG. 4, $R_W$ designates the ohmic resistance of a phase of the machine 11/FIG. 1.

The commanded phase voltages according to FIG. 4 result from:

$$u_{1C}=u_{A1C}+R_W\cdot K1\cdot(i_{1C}-K2\cdot i_{1M}) \tag{22}$$

$$u_{2C}=u_{A2C}+R_W\cdot K1\cdot(i_{2C}-K2\cdot i_{2M}) \tag{23}$$

$$u_{3C}=u_{A3C}+R_W\cdot K1\cdot(i_{3C}-K2\cdot i_{3M}) \tag{24}$$

The method according to the invention can be implemented with little hardware expenditure and in a compact design size, even for high rotational speeds of >10,000 $\text{min}^{-1}$. Current-regulating methods used previously, which involve frequency response compensation in polar coordinates, cannot be used with synchronous motors; that is, explicit determination of the angle of the space-current pointer fails in cases where the measured current disappears.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for current regulation in a permanently excited synchronous motor, in which a commanded current $i_R$ is controlled orthogonally to a magnet-wheel flow, wherein:

from measured current of two voltage phases $i_{1M}$ and $i_{2M}$ a magnitude for a current-space pointer $i_{AM}$ is determined according to $$i_{AM}=\sqrt{i_{1M}^2+i_{YS}^2}$$

with the value $i_{YS}$ being determined according to $$i_{YS}=-\frac{2}{\sqrt{3}}\left(i_{2M}+\frac{1}{2}i_{1M}\right);$$

an amount of a current error is determined according to $$\delta i_A=|i_R|-i_{AM};$$

the amount of the current error is added to the absolute value $|i_R|$ in a correction regulation;

from the measured current of two voltage phases $i_{1M}$ and $i_{2M}$ and an angle command $\epsilon_C$ of the current-space pointer, a measurement is determined for angle error, according to $$i\delta\epsilon=i_{1M}\cdot\sin(\epsilon_C)-i_{YS}\cdot\cos(\epsilon_C);$$

and the angle error is added to the desired angle value via a correction regulation $\epsilon_C$.

2. A method for current regulation in a permanently excited synchronous motor, according to claim 1, wherein said motor is adapted to actuate a rudder of a missile.

* * * * *